United States Patent
Cathey et al.

(10) Patent No.: US 9,274,026 B1
(45) Date of Patent: Mar. 1, 2016

(54) DETERMINING AN ANGULAR POSITION OF AN OUTPUT GEAR

(71) Applicant: L-3 Communications Corp., New York, NY (US)

(72) Inventors: Clinton B. Cathey, Salt Lake City, UT (US); Jeffrey J. McGill, West Haven, UT (US)

(73) Assignee: L-3 Communications Corp., New York, NY (US)

( * ) Notice: Subject to any disclaimer, the term of this patent is extended or adjusted under 35 U.S.C. 154(b) by 283 days.

(21) Appl. No.: 13/777,902

(22) Filed: Feb. 26, 2013

(51) Int. Cl.
  *G01M 13/02* (2006.01)
  *G01B 7/30* (2006.01)

(52) U.S. Cl.
  CPC ............... *G01M 13/021* (2013.01); *G01B 7/30* (2013.01)

(58) Field of Classification Search
  CPC .......... G01D 5/145; G01B 7/30; G01B 7/003; G01B 7/14
  USPC ........................................ 324/207.11–207.25
  See application file for complete search history.

(56) References Cited

U.S. PATENT DOCUMENTS

| | | | |
|---|---|---|---|
| 4,035,762 A | 7/1977 | Chanuel | |
| 5,347,277 A | 9/1994 | Nondahl et al. | |
| RE35,960 E * | 11/1998 | Ichiki et al. | 29/893.1 |
| 7,307,415 B2 * | 12/2007 | Seger et al. | 324/207.2 |
| 7,912,624 B2 * | 3/2011 | Schafer et al. | 701/105 |
| 2002/0087288 A1 | 7/2002 | Kim | |
| 2007/0132449 A1 * | 6/2007 | Madni et al. | 324/207.25 |
| 2011/0253953 A1 * | 10/2011 | Tanaka | 254/95 |

OTHER PUBLICATIONS

"Synchro and Resolver Engineering Handbook," Moog Components Group, Inc. (2004), 35 pages.

* cited by examiner

*Primary Examiner* — Alesa Allgood
(74) *Attorney, Agent, or Firm* — Kirton | McConkie (57) ABSTRACT

The angular position of an output gear can be determined from the phase difference between the angular positions of pinions engaged with the output gear. The first pinion can have a K-number of teeth, the second pinion can have an L-number of teeth, and the output gear can have an M-number of teeth. The relationship between K, L, and M can include the following: M is the least common multiple of K and L; and the absolute value of the difference between M divided by K and M divided by L is one. It can also be said that the absolute value of L subtracted from K is a non-zero integer.

30 Claims, 5 Drawing Sheets

DETERMINING AN ANGULAR POSITION OF AN OUTPUT GEAR

BACKGROUND

In a variety of devices and systems, it can be useful to know an angular position of an element of the device or system. For example, in a directional antenna system, it can be important to determine an angular position of a directional antenna about an axis relative to another part of the system. Optical systems and weapons systems are other examples of systems in which it can be desirable to determine an angular position of an element. Some embodiments of the present invention are directed to improved apparatus and processes for determining an angular position of a gear to which such an element of a device or system can be attached.

SUMMARY

In some embodiments, a device for determining an angular position of an output gear can include an output gear, a first pinion engaging the output gear, a second pinion engaging the output gear, and a controller. The first pinion can have a K-number of teeth and be rotationally coupled to a first angular position sensor configured to determine an angular position of the first pinion, and the second pinion can have an L-number of teeth and be rotationally coupled to a second angular position sensor configured to determine an angular position of the second pinion. The difference between L and K can be a non-zero integer. The controller can be electrically connected to the first angular position sensor and the second angular position sensor and be configured to determine an angular position of the output gear by determining a pinion phase difference, which is a difference between the angular position of the first pinion and the angular position of the second pinion.

In some embodiments, a process of determining an angular position of an output gear can include determining an angular position of a first pinion engaged with the output gear and determining an angular position of a second pinion engaged with the output gear. The first pinion can have a K-number of teeth, the second pinion can have an L-number of teeth, and a difference between L and K can be a non-zero integer. The process can further include determining an angular position of the output gear from a pinion phase difference, wherein the pinion phase difference is a difference between the angular position of the first pinion and the angular position of the second pinion.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Numerical data may be expressed or presented herein in a range format. It is to be understood that such a range format is used merely for convenience and brevity and thus should be interpreted flexibly to include not only the numerical values explicitly recited as the limits of the range, but also as including all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, "substantially" means sufficient to work for the intended purpose. The term "ones" means more than one.

As used herein, "output gear" refers to a gear that drives the angular position of an apparatus coupled to the output gear. Often, the output gear is the larger of two or more gears in engagement. The term "pinion" refers to the smaller of two gears in engagement.

Figure 1:
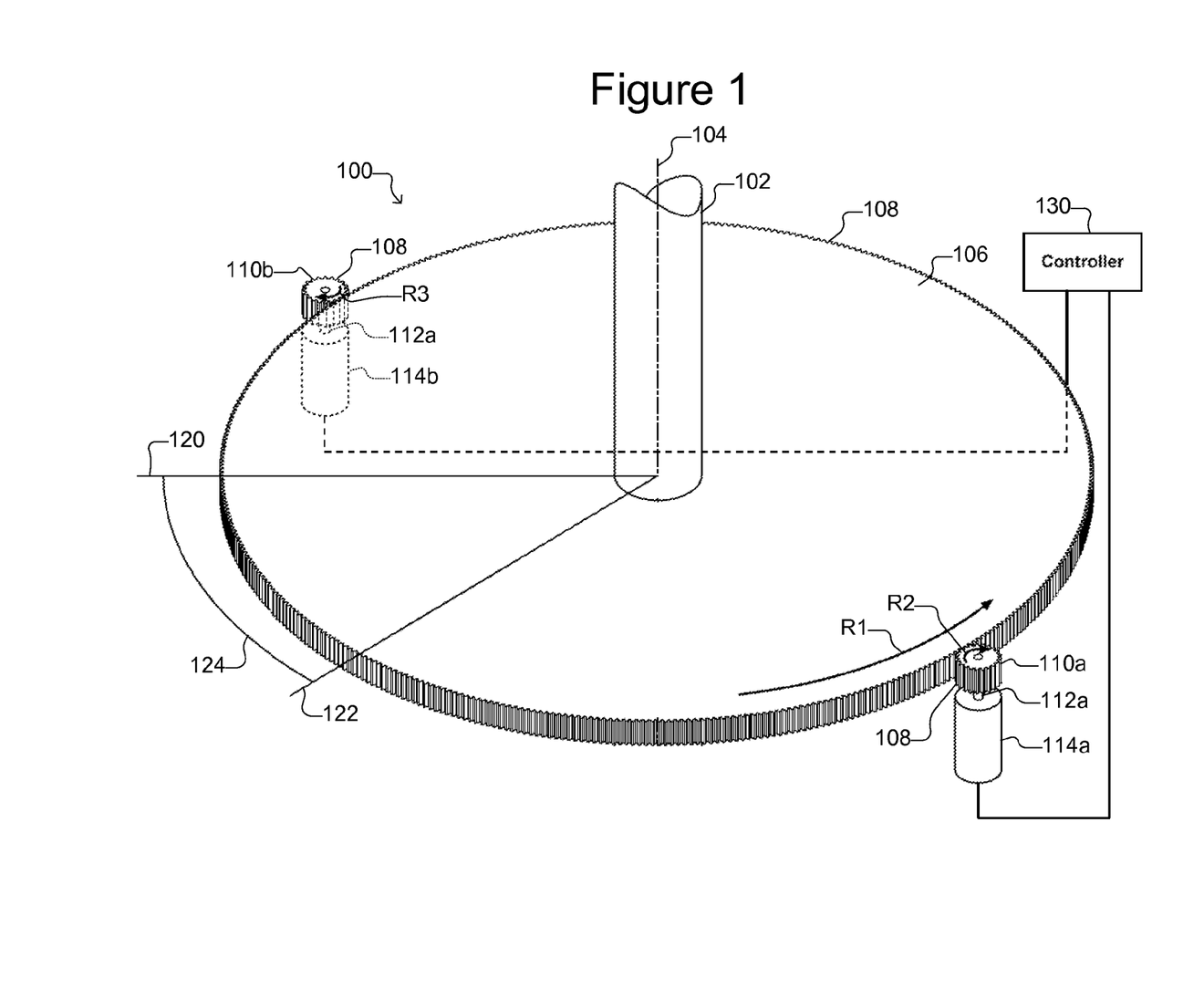
FIG. 1 is a perspective view of a device for determining the angular position of an output gear about an axis in accordance with some embodiments of the present invention.

FIG. 1 illustrates an example of a device 100 for determining the angular position of an output gear 106 about an axis 104 (e.g., an output axis) according to some embodiments of the invention. The device 100 can generally include an output gear 106, pinions 110, angular position sensors 114, and a controller 130. As shown, an apparatus 102 can be coupled to and thus rotate with the output gear 106. The angular position of the output gear 106 can thus correspond to an angular position of the apparatus 102.

The apparatus 102 can be any of a variety of different structures, devices, or the like. For example, the apparatus 102 can comprise a directional antenna, a launch structure of a weapons system, the transmitter and/or receiver of an optical communications system, or the like. As another example, the apparatus 102 can be a mounting structure by which any of the foregoing devices are mounted to the output gear 106. Regardless, the apparatus 102 can thus be configured to rotate with the output gear 106.

The output gear 106 can be a spur gear that includes a cylinder or disk with teeth 108 that project radially. Alternatively, the output gear 106 can comprise a toothed sprocket operating with a toothed timing belt, a toothed timing chain, or the like. Regardless, each tooth 108 can include opposing faces and a top land, as is known with current spur gears. Moreover, adjacent teeth 108 can be separated by a bottom land. The output gear 106 can have an M-number of teeth 108. M can be an integer between about 10 to 2000. The foregoing is an example only, and the number of teeth 108 M of the output gear 106 can be, in some embodiments, less than 10 or greater than 2000.

The two pinions 110 can each engage the output gear 106 at a separate location on the output gear 106. As shown, the two pinions 110 can be positioned so that they do not engage each other. As with the output gear 106, the two pinions 110 can each be a separate spur gear having a plurality of teeth 108, respectively. Alternatively, one or both of the pinions can comprise a toothed sprocket operating with a toothed timing belt, a toothed timing chain, or the like.

In some embodiments, the first pinion 110*a*, the second pinion 110*b*, and the output gear 106 can each have a different number of teeth 108. A first pinion 110*a* can be identified as having a K-number of teeth 108. A second pinion 110*b* can be identified as having an L-number of teeth 108. As noted, the output gear 106 can have an M-number of teeth 108.

In some embodiments, the relationship between K, L, and M (all of which can, of course, be integers) can include the following: M is the least common multiple of K and L; and the absolute value of the difference between M divided by K and M divided by L is one. In mathematic terms, this can be stated as follows: $LCM(K,L)=M$, where LCM is the least common multiple function; and $ABS((M/K)-(M/L))=1$, where ABS is the absolute value function, "/" means mathematical division, and "−" means mathematical subtraction. It can also be said that the absolute value of L subtracted from K is a non-zero integer. That is, $ABS(K-L)=INT$, where ABS is the absolute value function, "−" means mathematical subtraction, and INT is a non-zero integer. Non-limiting examples of sets of values for K, L, and M that meet the foregoing include: K=10, L=11, and M=110; K=20, L=22, and M=220; K=30, L=33, and M=330; K=20, L=30, and M=60; and K=20, K=21, and K=420.

In addition to the foregoing, in some embodiments, the gear ratio (i.e., the number M of teeth 108 of the output gear 106 divided by the number of teeth L or K of one of the pinions 110) between the first pinion 110*a* and the output gear 106 can be greater than two such that the output gear 106 has more than twice the number of teeth 108 than the first pinion 110*a*. Similarly, the gear ratio between the second pinion 110*b* and the output gear 106 can be greater than two. In some configurations, these gear ratios can be greater than three, five, ten, fifteen, or twenty, or any ratio between the foregoing numbers. The foregoing, however, are examples only, and the gear ratios can be less than three or greater than twenty in some embodiments.

Referring still to FIG. 1, in some embodiments, the pinions 110 can be anti-backlash (ABL) gears. For example, the pinions 110 can each be two spring-loaded gears, which can remove backlash in the gear meshes by forcing the teeth of the two gears to engage opposite sides of the gear teeth on the output gear. This characteristic can improve the accuracy of the device 100. Alternatively or in addition, the pinions 110 and the position sensors 114 can be mounted with a means to reduce or eliminate backlash in the gear meshes.

As further shown in FIG. 1, each pinion 110 can be rotationally connected to an angular position sensor 114. Thus, the first pinion 110*a* can be connected to a first angular position sensor 114*a*, and the second pinion 110*b* can be connected to a second angular position sensor 114*b*. Each pinion 110 can be connected to the angular position sensor 114 with a shaft 112 (shown as shaft 112*a* and shaft 112*b*, respectively). Each shaft 112 can be connected to a center of a pinion 110 so as to rotate with each pinion 110 and transfer the rotation of each pinion 110 to the respective angular position sensor 114 for measurement. The angular position sensors 114 can be each configured to measure and/or identify the angular position of the pinion 110 coupled to that angular position sensor 114. The angular position sensors can thus sense the angular positions of the pinions 110 about their respective axes. Various embodiments of the angular position sensor 114 can include one or more resolvers, synchros, potentiometers, encoders, Hall effect angular position sensors, rotary variable differential transformers, or the like.

As noted, the apparatus 102 can be coupled to the output gear 106 and thus rotate with the output gear 106. Referring still to FIG. 1, in some embodiments, the output gear 106 can thus rotate with and to the same degree as the apparatus 102 and vice versa. As the output gear 106 rotates, its teeth 108 engage the teeth 108 of the pinions 110, which rotate the two pinions 110. For the sake of illustration, FIG. 1 shows the output gear 106 rotating in a counterclockwise direction R1 (when viewed from the top down), and the pinions 110 being induced to rotate in clockwise directions R2 and R3. Moreover, because the gear ratio between the output gear 106 and each of the pinions 110 can be different, the first pinion 110*a* can rotate at a first rate and the second pinion 110*b* can rotate at a second rate that is different than the first rate. Additionally, as the output gear 106 completes a single rotation about the axis 104, each pinion 110 can complete multiple rotations about their respective axes.

The rotation of each pinion 110 can be measured by its respective angular position sensor 114, and these measurements can be transmitted and/or electronically communicated to the controller 130. The controller 130 can be electronically connected to both angular position sensors 114. The controller 130 can comprise a digital electronic controller such as one or more microprocessors, computers, or the like. The controller 130 can include memory, including a digital electronic memory such as one or more semiconductor, magnetic, optical, or the like based digital memory devices. The controller 130 can operate in accordance with programmed digital instructions (e.g., software, firmware, microcode, or the like) stored in the memory. Alternatively, the controller 130 can comprise hardwired digital logical circuits and operate under control of such hardwired circuits. As yet another alternative, the controller 130 can operate in accordance with both programmed digital instructions stored in the memory and hardwired circuits.

The controller 130 can be configured to determine an angular position of the output gear 106 and thus the apparatus 102 about the axis 104 using the measurements received from the angular position sensors 114. For the sake of illustrating the angular position of the output gear 106, the output gear 106 can be said to have a home orientation 120 in which the output gear 106 is said to be at a zero angle of rotation. This zero angle can be an arbitrary angle or can be selected based on a property of the apparatus 102 or objects connected to the apparatus 102. As the output gear 106 rotates to an offset orientation 122, the angle 124 between the home orientation 120 and the offset orientation 122 can be referred to as the angular position of the output gear 106. These terms and references can be merely illustrative, or can be utilized by the controller 130, in its processes. Similarly, each pinion 110 can have a home orientation and an angular position based on the home orientation. In other configurations, the output gear 106 and/or the pinions 110 can measure the angular position of the output gear 106 about the axis 104 using other points of reference, reference measurements, or determining processes.

Generally, the controller 130 can identify the angular position of the output gear 106 by, at least in part, identifying the difference between the angular position of the first pinion 110a and the angular position of the second pinion 110b. The difference between these angular positions can be referred to as a pinion phase difference. In some embodiments, the pinion phase difference can be the angular position of the output gear 106. For example, if the pinion phase difference between the angular position of the first pinion 110a and the second pinion 110b is 30°, the angular position of the output gear 106 can be 30°. Thus, the controller 130 can identify the angular position of the output gear 106 by determining the pinion phase difference.

Figure 2:
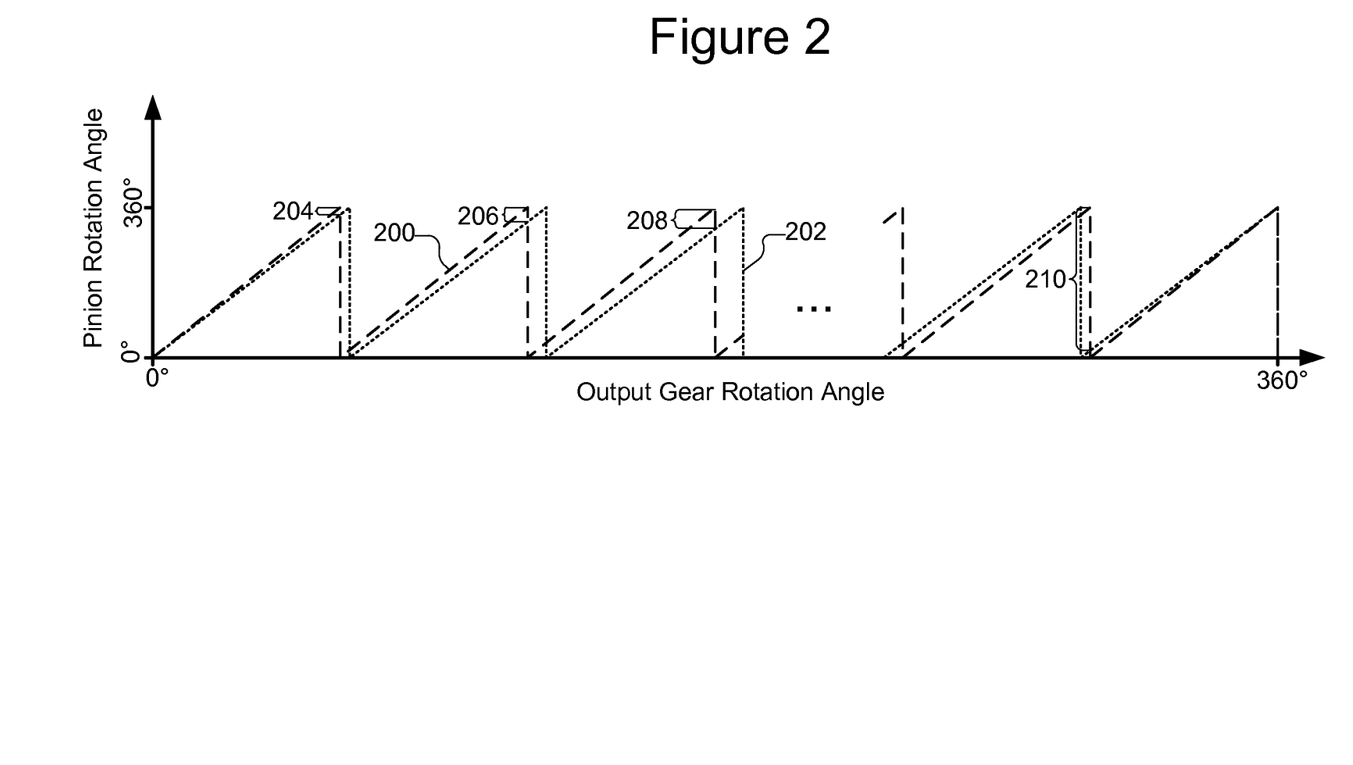
FIG. 2 is a graph showing angular positions of pinions and an output gear of the device of FIG. 1.

FIG. 2 graphically illustrates the angular position of both the first pinion 110a and the second pinion 110b of FIG. 1 on the vertical axis and the angular position of the output gear 106 of FIG. 1 on the horizontal axis. The range of both of the axes span between 0° and 360°.

FIG. 2 shows two separate lines, which represent the angular position 200 of the first pinion 110a and the angular position 202 of the second pinion 110b. As mentioned, the first pinion 110a and the second pinion 110b can have a different number of teeth 108. In this example, the first pinion 110a has fewer teeth than the second pinion 110b. As such, as the output gear 106 rotates, one of the two pinions 110 can rotate faster than the other. As shown, the first pinion 110a rotates faster than a second pinion 110b since it has fewer teeth 108. Thus, the angular position 200 of the first pinion 110a reaches 360°, or a full rotation, before the angular position 202 of the second pinion reaches 360°.

As the output gear 106 rotates from a home orientation 120 to an offset orientation 122 (see FIG. 1) a pinion phase difference is developed between the two pinions 110 due to the different number of teeth 108 of these pinions 110. The pinion phase difference is illustrated in FIG. 2. For the example, when the angular position 200 of the first pinion 110a first reaches 360° the angular position 202 of the second pinion 110b is less than 360°. The difference between the angular position 200 of the first pinion 110a and the angular position 202 of the second pinion 110b at this point is the pinion phase difference 204. As the output gear angular position increases, the pinion phase difference also increases. This is shown graphically in FIG. 2. For instance, as the pinion phase difference 206 is greater than pinion phase difference 204, the pinion phase difference 208 and pinion phase difference 210 further increase with the output gear angular position. Moreover, it will be understood that the pinion phase difference between the angular position 200 of the first pinion 110a and the angular position 202 of the second pinion 110b is at least approximately equal to the output gear angular position. Thus, the controller 130 can determine the output gear 106 angular position by determining the pinion phase difference.

Referring still to FIG. 2, as mentioned, the first pinion 110a can be identified as having a K-number of teeth 108, and the second pinion 110b can be identified as having an L-number of teeth 108. Given the above described constraints on K, L, and M (that is, LCM(K,L)=M and ABS((M/K)−(M/L))=1, from which it can follow that ABS(K−L)=INT, where INT is a non-zero integer), the angular positions 200 and 202 can both simultaneously arrive at 360° when the angular position of the output gear also arrives at 360°, having made a complete rotation. Additionally, this instance can be the first instance in which the angular positions of the pinions 110 and the output gear 106 simultaneously arrive at 360°, as shown. Thus, under these conditions, the pinion phase difference can consistently be equal to the angular position of the output gear 106.

It will be understood that, in some embodiments, the angular position sensors 114 connected to the pinions 110 may include a certain degree of inaccuracy. For example, an angular position sensor 114 may have a margin of error of approximately +/−n-arc minutes. As such, the pinion phase difference determined by the controller 130 may not be precisely accurate. Accordingly, in these embodiments, the controller 130 can be configured to perform further determinations in order to arrive at a more accurate angular position. These further determinations will now be described with reference to FIG. 3.

Figure 3:
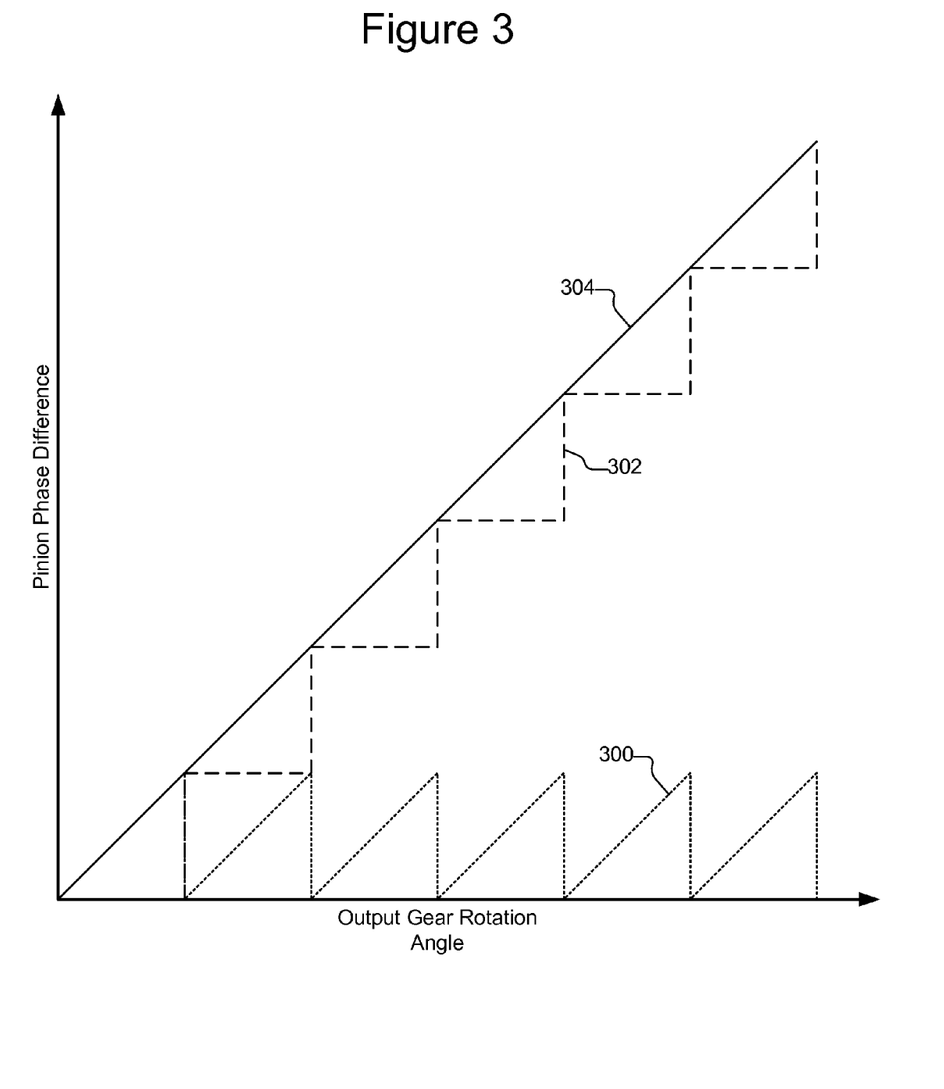
FIG. 3 is a graph depicting determination of an angular position of the output gear using coarse and fine measurements in accordance with some embodiments of the present invention.

FIG. 3 graphically illustrates the computation of a more accurate angular position of the output gear 106. This graph generally shows the use of a coarse measurement 302 that is added to a fine measurement 300 to arrive at the output gear 106 angular position 304. In general, to accommodate inaccuracy in the angular position sensors 114, the pinion phase difference can be used merely as a coarse measurement 302 of the output gear angular position 304. This coarse measurement 302 can identify a general range in which the true output gear angular position 304 is located. This coarse measurement 302 can be determined using a variety of processes. For example, a coarse measurement 302 can be determined by rounding the pinion phase difference to the nearest degree, three degrees, five degrees, etc. The pinion phase difference can also be rounded to a center, upper end, or lower end of a range. This rounding can produce the step-like pattern of the coarse measurement 302 shown in FIG. 3.

As shown, the coarse measurement can then be added to a fine measurement 300 to arrive at a more accurate output gear 106 angular position 304. A fine measurement 300 can be identified using one of the pinions 110. Because of their relative gear ratios, a relatively small rotation of the output gear 106 can produce a relatively large rotation of a pinion 110. More specifically, when a pinion 110 completes a full 360° rotation, the output gear 106 rotates to a lesser degree, which will be referred to herein as "P rotation" of the output gear 106 for that pinion 110. This P rotation is equal to 360° divided by the gear ratio between the pinion 110 and the output gear 106. That is, the gear ratio can be M/K for the first pinion 110a, and the gear ratio can be M/L for the second pinion 100b, where, as noted above, M is the number of teeth 108 of the output gear 106, K is the number of teeth 108 of the first pinion 110a, L is the number of teeth 108 of the second pinion 110b, and "/" represents mathematic division. In one example, an output gear 106 can include 420 teeth, and a pinion 110 can include 20 teeth. In this example, the gear ratio is 21. Thus, when the pinion 110 rotates 360°, the output gear 106 rotates only about 17.1°. In this example, 17.1° is the rotation of the output gear 106 for that pinion 110. The foregoing are only numerical examples and are not limiting.

To determine the fine measurement 300, the angular position of the single pinion 110 can be divided by the gear ratio between the output gear 106 and that pinion 110. An example of a fine measurement 300 is shown in FIG. 3 superimposed on the graph of the coarse measurement 302 and output gear angular position 304. Because the angular position of the pinion 110 is divided by the gear ratio, any error inherent in the measurement of this pinion angular position will also be divided by the same ratio and thus reduced. Accordingly, the angular position of the pinion 110 can be used as a fine measurement.

In some embodiments, the pinion phase difference is rounded to the nearest P rotation. This rounding can be to the middle of the range covered by each P rotation, or to the upper or lower ends of that range. When the pinion phase difference is rounded to the nearest P rotation to arrive at a coarse measurement 302, as shown, it can be added to the fine measurement 300 to arrive at the output gear angular position 304. Using these or similar processes, margins of error within the angular position sensors 114 can be reduced and/or substantially eliminated from the resulting output gear angular position 304.

Accordingly, the present device 100 (shown in FIG. 1) can be configured to produce a high accuracy absolute position measurement that uses relatively simple parts and need perform only relatively simple calculations. Moreover, due to the simplicity of the gear design, the device 100 can have a relatively low cost and weight and may be easily repairable or replaceable. Additionally, the device 100 may not require additional on-axis components that may hinder the design of the apparatus 102 and its respective components.

It is noted that, as the output gear 106 is rotated, the sensors 114a and 114b can repeatedly sense new angular positions of the pinions 110a and 110b. The controller 130 can then repeatedly determine new angular positions of the output gear 106 based on newly determined phase differences between the new angular positions of the pinions 110a and 110b. The controller 130 can thus repeatedly determine new angular positions of the output gear 106 (and the thus the apparatus 102) as the output gear 106 rotates.

Figure 4:
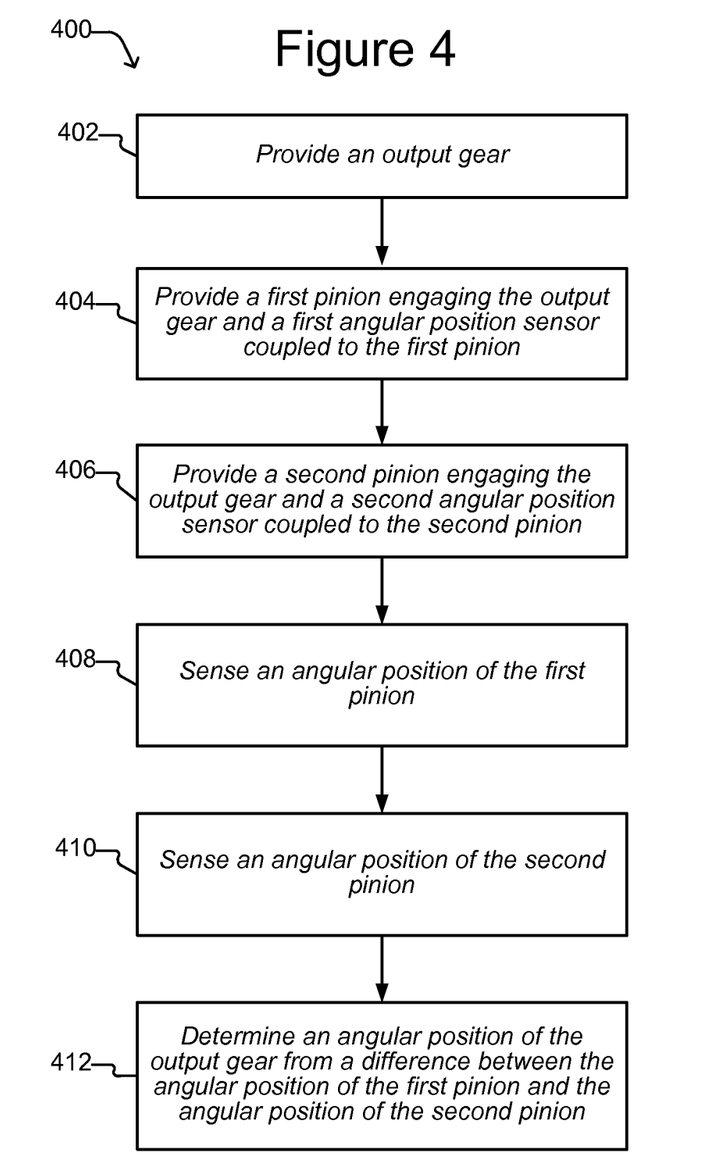
FIG. 4 is a flow chart of a process for determining an angular position of an output gear in accordance with some embodiments of the present invention.

Reference will now be made to FIG. 4, which illustrates a flowchart of a process 400 for determining an angular position of the output gear 106 about an axis 104 in accordance with some embodiments of the invention. An example of an output gear 106 and an axis 104 is shown in FIG. 1. As discussed above with respect to FIG. 1, the output gear 106 can be connected to a structure 102 that rotates about the axis 104, such as an antenna, weapon launch structure, optical transmitter/receiver, or the like.

In step 402 of the process 400, an output gear 106 is provided. As shown, an apparatus 102 can be coupled to the output gear 106. As shown in FIG. 1, the output gear 106 can be directly connected to the apparatus 102 at a center portion of the output gear 106 so that the output gear 106 rotates about the axis 104 as the apparatus 102 rotates about the axis 104. Moreover, the output gear 106 rotates about the axis 104. The output gear 106 can have an M-number of teeth 108.

In step 404, a first pinion 110a is provided that engages the output gear 106, and a first angular position sensor 114a is coupled to the first pinion 110a. The first pinion 110a can be connected to the first angular position sensor 114a with a shaft 112a. The shaft 112a can be connected to a center of the pinion 110a so as to rotate with the pinion 110a and transfer the rotation of the pinion 110a to the angular position sensor 114a for measurement. In step 406, a second pinion 110b is provided that engages the output gear 106, and a second angular position sensor 114b is coupled to the second pinion 110b. In some embodiments, a housing is also provided that covers and positions the first pinion 110a, the first angular position sensor 114a, the second pinion 110b, the second angular position sensor 114b, and/or the output gear 106.

The number K of teeth 108 of the first pinion 110a, the number L of teeth 108 of the second pinion 110b, and the number M of teeth 108 of the output gear 106 can meet the above stated criteria. That is, $LCM(K,L)=M$ and $ABS((M/K)-(M/L))=1$, from which it can follow that $ABS(K-L)=INT$, where INT is a non-zero integer.

At steps 408 and 410, the first angular position sensor 114a can sense the angular position of the first pinion 110a, and the second angular position sensor 114 can sense the angular position of the second pinion 110b as discussed above. As also discussed above, the angular positions of the first pinion 110a and the second pinion 110b can be provided to the controller 130. At step 412, the controller 412 can determine an angular position of the output gear 106 and thus the apparatus 102 about the axis 104. As discussed above, the controller 130 can do so from a pinion phase difference between the angular position of the first pinion 110a and the angular position of the second pinion 110b, which can be the determined angular position of the output gear 106.

Figure 5:
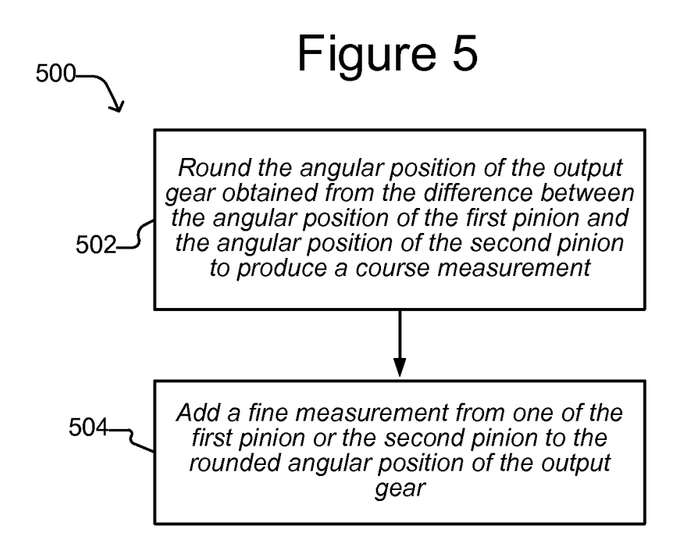
FIG. 5 is a flow chart of a process for refining the determined angular position of an output gear in accordance with some embodiments of the invention.

As illustrated in FIG. 5 and in accordance with the discussion of FIG. 3 above, in some embodiments, the angular position of the output gear 106 determined at step 412 can be rounded at step 502 of the process 500 of FIG. 5 to an integer multiple of 360° divided by the gear ratio between the first pinion 110a or the second pinion 110b and the output gear 106 to produce a coarse measurement of the angular position of the output gear 106. Also in accordance with the discussion of FIG. 3 above, at step 504 of the process 500, the angular position of the first pinion 110a or the second pinion 110b utilized in step 502 divided by the gear ratio utilized in step 502 can be added as a fine measurement to the course measurement produced at step 502. The controller 130 can perform the determinations of steps 502 and 504, and the determined angular position of the output gear 106 can be the result of step 504.

The angular position of the output gear 106 can thus be determined as the result of step 412 of FIG. 4 or step 504 of FIG. 5. Thereafter, as the output gear 106 is rotated, steps 408, 410, and 412 of FIG. 4 and optionally steps 502 and 504 of FIG. 5 can be repeated to sense new angular positions of the first and second pinions 110a and 110b (at steps 408 and 410) and determine a new angular position of the output gear 106 (and thus the apparatus 102, which rotates with the output gear 106) at step 412 and optionally steps 502 and 504.

Although specific embodiments and applications of the invention have been described in this specification, these embodiments and applications are exemplary only, and many variations are possible.

We claim:

1. A device for determining an angular position of an output gear, the device comprising:
    an output gear;
    a first pinion engaging said output gear, said first pinion having a K-number of teeth, said first pinion being rotationally coupled to a first angular position sensor configured to determine an angular position of said first pinion;
    a second pinion engaging said output gear, said second pinion having an L-number of teeth, a difference between L and K being a non-zero integer, said second pinion being rotationally coupled to a second angular position sensor configured to determine an angular position of said second pinion; and
    a controller electrically connected to said first angular position sensor and said second angular position sensor, said controller being configured to determine an angular position of said output gear by determining a pinion phase difference, which is a difference between said angular position of said first pinion and said angular position of said second pinion wherein:
said pinion phase difference increases as said output gear rotates in a first direction from an initial angular position to an intermediate angular position, and
said pinion phase difference decreases as said output gear rotates in said first direction from said intermediate angular position to said initial angular position.

2. The device of claim 1, wherein:
said pinion phase difference increases from a minimum value to a maximum value as said output gear rotates in said first direction from said initial angular position to said intermediate angular position, and
said pinion phase difference decreases from said maximum value to said minimum value as said output gear rotates in said first direction from said intermediate angular position to said initial angular position.

3. The device of claim 1, wherein said output gear has an M-number of teeth, wherein M is a least common multiple of K and L.

4. The device of claim 3, wherein an absolute value of a difference between M divided by K and M divided by L is one.

5. The device of claim 3, wherein a gear ratio between said output gear and said first pinion and a gear ratio between said output gear and said second pinion are each greater than two.

6. The device of claim 3, wherein said first pinion and said second pinion are anti-backlash (ABL) gears.

7. The device of claim 3 further comprising a directional antenna coupled to said output gear such that said directional antenna rotates with said output gear.

8. The device of claim 7, wherein as said output gear is rotated, said controller is configured to determine a new angular position of said output gear by determining a new pinion phase difference from a new angular position of said first pinion sensed by said first angular position sensor and a new angular position of said second pinion sensed by said second angular position sensor.

9. A device for determining an angular position of an output gear, the device comprising:
an output gear;
a first pinion engaging said output gear, said first pinion having a K-number of teeth, said first pinion being rotationally coupled to a first angular position sensor configured to determine an angular position of said first pinion;
a second pinion engaging said output gear, said second pinion having an L-number of teeth, a difference between L and K being a non-zero integer, said second pinion being rotationally coupled to a second angular position sensor configured to determine an angular position of said second pinion; and
a controller electrically connected to said first angular position sensor and said second angular position sensor, said controller being configured to determine an angular position of said output gear by determining a pinion phase difference, which is a difference between said angular position of said first pinion and said angular position of said second pinion,
wherein:
said output gear has an M-number of teeth, where M is a least common multiple of K and L, and
said controller is further configured to determine said angular position of said output gear by (i) dividing said angular position of said first pinion by a gear ratio between said output gear and said first pinion to produce a fine measurement, and (ii) adding said fine measurement to said pinion phase difference.

10. The device of claim 9, wherein, said controller is further configured, prior to adding said fine measurement to said pinion phase difference, to round said pinion phase difference to an integer multiple of a value of 360 divided by said gear ratio.

11. A process of determining an angular position of an output gear, the process comprising:
determining an angular position of a first pinion engaged with said output gear, said first pinion having a K-number of teeth;
determining an angular position of a second pinion engaged with said output gear, said second pinion having an L-number of teeth, a difference between L and K being a non-zero integer; and
determining an angular position of said output gear from a pinion phase difference, wherein said pinion phase difference is a difference between said angular position of said first pinion and said angular position of said second pinion,
wherein:
said pinion phase difference increases as said output gear rotates in a first direction from an initial angular position to an intermediate angular position, and
said pinion phase difference decreases as said output gear rotates in said first direction from said intermediate angular position to said initial angular position.

12. The process of claim 11, wherein:
said pinion phase difference increases from a minimum value to a maximum value as said output gear rotates in said first direction from an initial angular position to an intermediate angular position, and
said pinion phase difference decreases from said maximum value to said minimum value as said output gear rotates in said first direction from said intermediate angular position to said initial angular position.

13. The process of claim 11, wherein said output gear has an M-number of teeth, and wherein M is a least common multiple of K and L.

14. The process of claim 13, wherein an absolute value of a difference between M divided by K and M divided by L is one.

15. The process of claim 13, wherein:
said determining said angular position of said first pinion comprises receiving an output of a first angular position sensor rotationally coupled to said first pinion; and
said determining said angular position of said second pinion comprises receiving an output of a second angular position sensor rotationally coupled to said second pinion.

16. The process of claim 13, wherein said determining said angular position of said output gear comprises dividing said angular position of said first pinion by a gear ratio between said output gear and said first pinion to produce a fine measurement.

17. The process of claim 13, wherein a gear ratio between said output gear and said first pinion and said gear ratio between said output gear and said second pinion are each greater than two.

18. The process of claim 13 further comprising reducing backlash in gear meshes of said first pinion and said second pinion.

19. The process of claim 13, wherein said first pinion and said second pinion are anti-backlash (ABL) gears.

20. The process of claim 13 further comprising rotating said output gear, wherein said steps of determining said angular position of said first pinion, determining said angular position of said second pinion, and determining said angular position of said output gear are repeated to determine a new angular position of said output gear as said output gear rotates.

21. The process of claim 20, wherein:
   a directional antenna is coupled to said output gear such that said directional antenna rotates with said output gear, and
   said new angular position of said output gear is an angular position of said antenna.

22. A process of determining an angular position of an output gear, the process comprising:
   determining an angular position of a first pinion engaged with said output gear, said first pinion having a K-number of teeth;
   determining an angular position of a second pinion engaged with said output gear, said second pinion having an L-number of teeth, a difference between L and K being a non-zero integer; and
   determining an angular position of said output gear from a pinion phase difference, wherein said pinion phase difference is a difference between said angular position of said first pinion and said angular position of said second pinion,
   wherein:
      said output gear has an M-number of teeth, where M is a least common multiple of K and L, and
      said determining said angular position of said output gear comprises:
         dividing said angular position of said first pinion by a gear ratio between said output gear and said first pinion to produce a fine measurement,
         rounding said pinion phase difference to an integer multiple of a value of 360 divided by said gear ratio to produce a rounded value of said pinion phase difference, and
         adding said fine measurement to said rounded value of said pinion phase difference.

23. A process of determining an angular position of an output gear, the process comprising:
   determining an angular position of a first pinion engaged with said output gear, said first pinion having a K-number of teeth;
   determining an angular position of a second pinion engaged with said output gear, said second pinion having an L-number of teeth, a difference between L and K being a non-zero integer; and
   determining an angular position of said output gear from a pinion phase difference, wherein said pinion phase difference is a difference between said angular position of said first pinion and said angular position of said second pinion,
   where said determining said angular position of said output gear comprises adding a rounded value of said pinion phase difference to said angular position of said first pinion divided by a gear ratio of said output gear to said first pinion.

24. The process of claim 23, wherein said gear ratio is M/K, where M is a number of teeth of said output gear.

25. The process of claim 24, wherein said rounded value is said pinion phase difference rounded to a nearest one of a plurality of stepped values.

26. The process of claim 25, wherein each said stepped value is a constant value through a 360° revolution of said first pinion.

27. A device for determining an angular position of an output gear, the device comprising:
   an output gear;
   a first pinion engaging said output gear, said first pinion having a K-number of teeth, said first pinion being rotationally coupled to a first angular position sensor configured to determine an angular position of said first pinion;
   a second pinion engaging said output gear, said second pinion having an L-number of teeth, a difference between L and K being a non-zero integer, said second pinion being rotationally coupled to a second angular position sensor configured to determine an angular position of said second pinion; and
   a controller electrically connected to said first angular position sensor and said second angular position sensor, said controller being configured to determine an angular position of said output gear by determining a pinion phase difference, which is a difference between said angular position of said first pinion and said angular position of said second pinion,
   where said controller is further configured to determine said angular position of said output gear by adding a rounded value of said pinion phase difference to said angular position of said first pinion divided by a gear ratio of said output gear to said first pinion.

28. The device of claim 27, wherein said gear ratio is M/K, where M is a number of teeth of said output gear.

29. The device of claim 28, wherein said rounded value is said pinion phase difference rounded to a nearest one of a plurality of stepped values.

30. The device of claim 29, wherein each said stepped value is a constant value through a 360° revolution of said first pinion.

* * * * *